United States Patent [19]

Deserno et al.

[11] 4,046,537

[45] Sept. 6, 1977

[54] METHOD FOR THE PRODUCTION OF ONE-MATERIAL OPTICAL FIBERS

[75] Inventors: Ulrich Deserno; Franz Auracher, both of Munich, Germany

[73] Assignee: Siemens Aktiengesellschaft, Berlin & Munich, Germany

[21] Appl. No.: 676,678

[22] Filed: Apr. 14, 1976

[30] Foreign Application Priority Data

Apr. 15, 1975 Germany .............................. 2516387

[51] Int. Cl.² .................... C03B 37/00; C03B 23/04; C03B 23/20; C03B 21/00
[52] U.S. Cl. .......................................... 65/2; 65/3 A; 65/13; 65/23; 65/17; 65/36; 65/108; 65/110; 350/96 WG; 65/DIG. 7
[58] Field of Search ............. 350/96 WG; 65/DIG. 7, 65/54, DIG. 9, 36, 4 R, 4 B, 108, 23, 3 A, 2, 13, 17, 110

[56] References Cited

U.S. PATENT DOCUMENTS

| 1,806,507 | 5/1931 | Smalley .................. 65/DIG. 7 |
|---|---|---|
| 1,926,552 | 9/1933 | Morgan .................. 65/DIG. 7 |
| 2,706,366 | 4/1955 | Best ........................ 65/23 X |
| 2,822,501 | 2/1958 | Poulter ................... 65/110 X |
| 3,622,291 | 11/1971 | Fleck et al. ........... 65/108 X |
| 3,646,472 | 2/1972 | Cooper et al. ........... 65/4 B |
| 3,677,730 | 7/1972 | Deradoorian et al. ........ 65/36 |
| 3,712,705 | 1/1973 | Marcatilli ............ 65/DIG. 7 |
| 3,805,735 | 4/1974 | Reuschel et al. ....... 65/DIG. 7 |
| 3,844,752 | 10/1974 | Kaiser .................. 65/DIG. 7 |
| 3,901,674 | 8/1975 | Strack et al. ............. 65/3 A |
| 3,902,879 | 9/1975 | Siegmund ................. 65/3 A |
| 3,950,073 | 4/1976 | Horiguchi et al. ...... 65/DIG. 7 |
| Re. 28,664 | 12/1975 | Miller ................... 65/DIG. 7 |

OTHER PUBLICATIONS

Bell Systems Technical Journal pp. 1021 to 1039 – Single Material Optical Fibers.

*Primary Examiner*—S. Leon Bashore
*Assistant Examiner*—Frank W. Miga
*Attorney, Agent, or Firm*—Hill, Gross, Simpson, Van Santen, Steadman, Chiara & Simpson

[57] ABSTRACT

A method for the production of single-material optical fibers having a light conducting core supported within a protective sleeve by at least one extremely thin support component characterized by providing a blank having a core and at least one support component disposed within a protective sleeve, heating the blank to a drawing temperature, drawing the blank into a form of an optical fiber and either during the drawing or subsequent thereto, transversely stretching the support component to reduce the ratios of the thickness of the support component to its transverse width and to the thickness of the core of the fiber. In one embodiment of the invention, subsequent to the drawing, a fluid such as a gas under excessive pressure is applied internally to the protective sleeve to expand and inflate the sleeve to transversely stretch the support component. In a second embodiment of the invention, a transverse stretching of the support component is accomplished by asymmetric radial deformation of a circular or noncircular fiber or blank.

6 Claims, 8 Drawing Figures

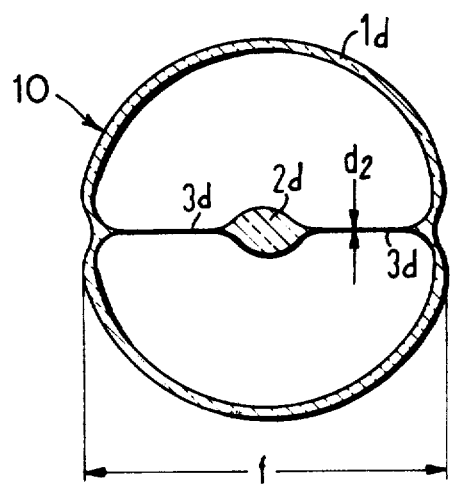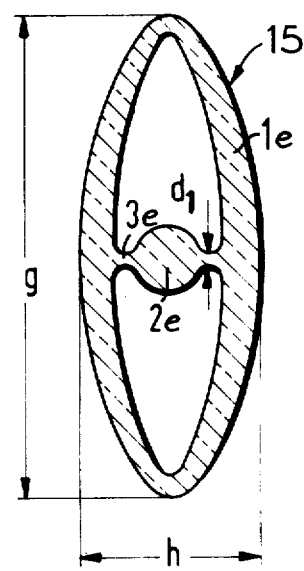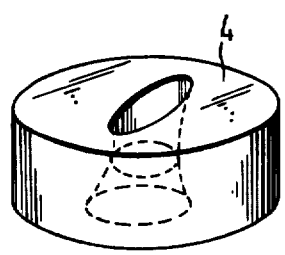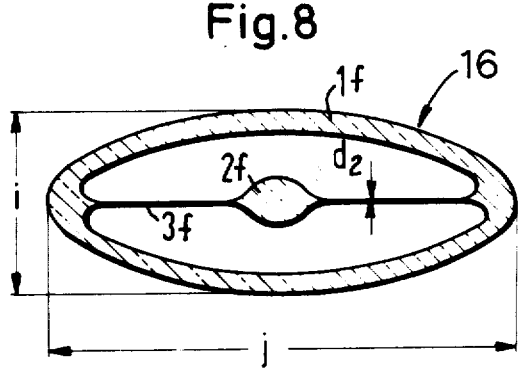

METHOD FOR THE PRODUCTION OF ONE-MATERIAL OPTICAL FIBERS

BACKGROUND OF THE INVENTION

1. Field of the Invention

The present invention relates to a method for the production of one-material optical fibers which consist of a light guiding core supported by at least one support component within a protective casing.

2. Prior Art

Particularly suitable light conducting fibers having a low attenuation are single-material or one-material optical fibers which are also known as slab coupled dielectric waveguides or rib waveguides. The one-material fiber preferably consists of an amorphous quartz, which can be produced in a very pure form and thus have a low optical attenuation.

Light conducting fibers, which are of the one material type, are usually produced by assembling a blank having a core supported by a support component within an outer tube, which is of the same material as the core and support component, and the dimensions of the core and tube are selected so that the core is substantially surrounded by air while within the sleeve. The blank is heated and drawn with the outer tube providing a protective sleeve that protects the fiber core and eases its manipulation. An example of the process of forming single-material or one-material optical fibers is discussed in an article by P. Kaiser and H. W. Astle, "Low-Loss Single-Material Fibers Made From Pure Fused Silica", *The Bell System Technical Journal*, Vol. 53, No. 6, July-August 1974, pp. 1021-1039.

In monomode fibers of this type of construction, the numerical aperture $A_N$ is governed by the following equation $$A_N = \lambda_O/2d_s$$

where $\lambda_O$ is the wavelength of the conducted light and $d_s$ is the thickness of the support component on which the light conducting core is suspended in the protective sleeve. Under unfavorable conditions, for example when a spatially incoherent light source, which may be a luminescence diode, is used, the light power, which is input-coupled into the fiber, increases with the square of the exploitable numerical aperture and thus in the manner of $1/d_s^2$. If it is desired for example to obtain a value of the numerical aperture $A_N = 0.5$, it is necessary to select $d_s, \lambda_O$. Thus, the thickness of the support component is equal to the light wavelength, which is for instance 0.65 μm.

In the production of one-material fibers or single-material fibers of this type, one usually commences from a blank which is stretched in length at approximately $10^4$ times and the cross-sectional area will be decreased by this same factor. The linear reduction in the cross-sectional dimensions is then $\sqrt{10^4}$ = a hundredfold. In practice, surface tensions lead to an adulteration of the ideal similarity transformation. In particular, the surface tension result in a lateral contraction with an undesirable thickening of the support component or components. In order to obtain the thickness of 0.65 μm for the support components in the final fiber, and assuming a deformation by a drawing factor of $10^4$, the support components in the blank prior to drawing would need be thinner than 65 μm. However, it is not readily possible to produce and to use such a thin support component which will have a width of a few mm and a length of approximately 100 mm.

SUMMARY OF THE INVENTION

The present invention is directed to providing a method for the production of one-material optical fibers in which the requirement of providing extremely thin support components in the blank prior to drawing is avoided and which method nevertheless produces very thin support components in the finished fiber so that the acceptance angle and thus the quantity of conducted light in the fiber is considerably increased.

To accomplish these tasks, the method comprises providing a blank having a core and at least one support component disposed within a protective sleeve, heating the blank to a drawing temperature, drawing the blank into the form of the fiber, and transversely stretching, which is understood to be stretching in a direction transverse to the axis of the core or fiber, the support component to reduce the ratio of the thickness of the support component to the thickness of the core of the fiber. To transversely stretch the support component, the fiber is geometrically dissimilarly deformed either during the step of drawing or subsequent thereto. In one embodiment of the process, the stretching is performed by applying an excess pressure to the interior of the fiber to expand and inflate the protective sleeve to increase its diameter and cross-section and to cause the transverse stretching of the support component. In a second embodiment of the invention during either the step of drawing the blank to the fiber or in a second production step, the stretching step involves asymmetric radial deformation of the fiber so that the support components are transversely stretched. Such a deformation can be obtained by utilizing a noncylindrical drawing die.

BRIEF DESCRIPTION OF THE DRAWINGS

FIG. 5 is a cross-sectional view of a one-material optical fiber produced in accordance with the present invention;

FIG. 6 is a cross-sectional view of a noncylindrical fibre in accordance to a second embodiment of the present invention;

FIG. 7 is a perspective view of a suitable drawing die utilized in a second embodiment of the present invention; and FIG. 8 is a cross-sectional view of a one-material optical fiber produced by the second embodiment of the present invention.

DESCRIPTION OF THE PREFERRED EMBODIMENTS

The principles of the present invention are particularly useful in forming the one-material or single-material optical fibers such as the fiber generally indicated at 10 in FIG. 5.

Figure 1:
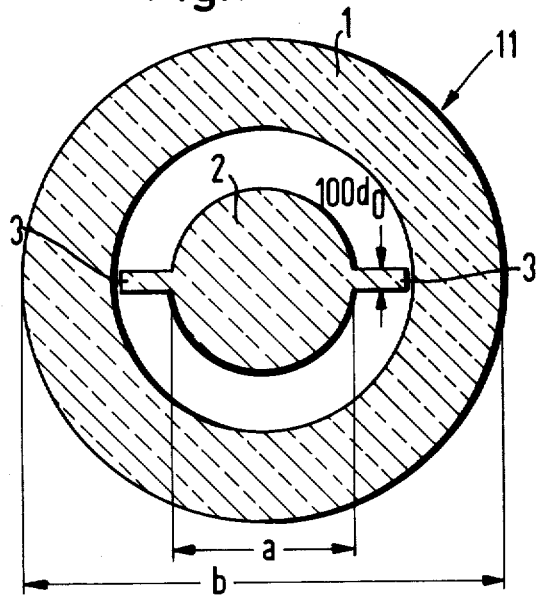
FIG. 1 is a cross-sectional view of a blank prior to the step of drawing in accordance with the present invention.

To form the fiber 10, the method of the present invention utilizes a blank generally indicated at 11 in FIG. 1. The blank 11 comprises a sleeve 1 with a light conducting core 2 coaxially assembled therein. As illustrated, support components 3 are integrally formed on the core 2. The blank possesses for example the following cross-sectional dimensions. The core 2 has a diameter $a$ of 3 mm, the outer sleeve 1 has a diameter $b$ of 8 mm and the support components 3 have a thickness which is approximately 100 times the thickness $d_0$ of the support components in a finished drawn fiber.

Figure 2:
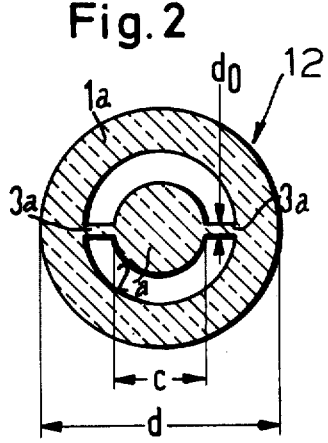
FIG. 2 is a cross-sectional view of a one-material optical fiber produced in an ideal situation.

In an ideal situation, subsequent to heating the blank 11 and subjecting it to a drawing process, which may comprise a plurality of drawing steps, a one-material optical fiber generally indicated at 12 in FIG. 2 would be produced. Ideally, with a longitudinal stretching factor of $10^4$ the fiber would have a core $2a$ with a diameter $c = 30$ $\mu$m and an outer protective sleeve $1a$ having a diameter of $d = 80$ $\mu$m. The support components $3a$ would have the ideal thickness of $d_0$ and as illustrated, are fused into the sleeve $1a$ so that the core $2a$ is disposed within the protective sleeve $1a$ and spaced therefrom by an air space which substantially surrounds the core $2a$.

Figure 3:
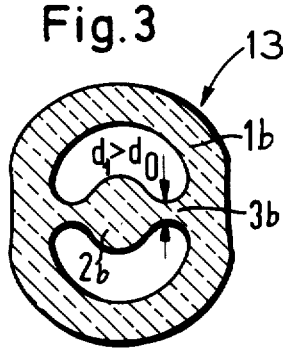
FIG. 3 is a cross-sectional view of a one-material optical fiber obtained in a normal drawing process.

This ideal situation, however, cannot be achieved in normal drawing practice. During the process of drawing the blank 11 to form the fiber 12, surface tensions will occur. As a result, the drawing process will produce a fiber generally indicated at 13 in FIG. 3. The fiber 13 has a non-circular protective sleeve $1b$ which is connected by support components $3d$ to a core $2b$. The support components $3d$ will have a thickness $d_1$ which is considerably greater than the ideal thickness $d_0$. This increased thickness is attributed to problems of surface tension which occur during the drawing process.

Figure 4:
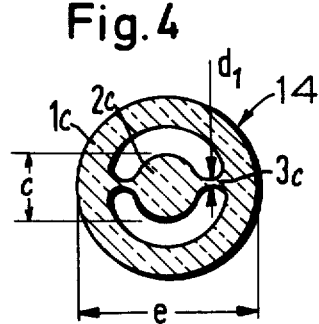
FIG. 4 is a cross-sectional view of a suitable fiber prior to treatment in accordance with the present invention.

In accordance with the present invention, the blank 11 is heated and subjected to a drawing process including one or more drawing steps to produce a fiber generally indicated at 14 in FIG. 4. The fiber 14 has a protective sleeve $1c$ with a diameter $e = 50$ $\mu$m which is connected by support components $3c$ of thickness $d_1 = 3$ $\mu$m to a core $2c$ which has a core diameter of $c = 17$ $\mu$m. The support components $3c$ are subjected to a transverse stretching step which is accomplished by pulling the fiber through a local heater, applying a fluid such as a gas e.g. nitrogen or argon from one end to the interior of the sleeve $1c$ to inflate and expand the diameter or cross-sectional size of the protective sleeve $1c$ in the heated zone into a configuration of a protective sleeve $1d$ of the fiber 10 (FIG. 5). The treatment is applied to the fiber continuously over the full length. The application of a fluid under pressure to the interior of the sleeve only slightly affects the configuration of the core $2c$ to stretch it to a configuration of the core $2d$. However, the inflating or expansion of the sleeve $1c$ to the configuration of the sleeve $1d$ effectively transversely stretches the support components $3c$ in a direction extending transverse to the axis of the core $2c$ into support components $3d$. By this, the space factor of the fiber, this is the ratio between the area of the light conducting core $2d$ and the overall cross-sectional area of the fiber 10, is considerably reduced. Utilizing the inflation or expansion step, the protective sleeve or casing $1d$ will have a diameter $f$ which is increased to 250 $\mu$m. With such an increase in the diameter of the sleeve $1d$, it is possible to achieve a thickness $d_2$ of 0.65 $\mu$m for the support components $3d$.

In the above described embodiment of the method of the present invention, the transversely stretching is accomplished by geometrically dissimilarly deforming the drawn blank subsequent to the drawing process or steps. In a second embodiment of the method of the present invention, the fiber is drawn with a non-circular cross-section from a non-circular preform and in a second production step radially non-rotational-symmetrically deformed by drawing it through a heated drawing die 4 or a nozzle which is approximately shaped as illustrated in FIG. 7. In FIG. 6 the fiber in its intermediate state before the second production step is indicated as 15. It has a non-circular cross section which is illustrated as being elliptical. For example, the fiber 15 has a noncircular sleeve $1e$ which has a length or dimension $g = 150$ $\mu$m along a major axis of the cross section and a dimension or a length $h = 50$ $\mu$m along the minor axis. The core $2e$ is supported by support components $3e$ which have a thickness $d_1 = 3$ $\mu$m which extend along the minor axis or aong the dimension $h$ and transverse to the dimension $g$. The fiber 15 is drawn through the die or nozzle 4 which applies an exterior force to the blank in a direction parallel to the dimension $g$ so that a one-material fiber generally indicated at 16 in FIG. 8 is produced. Fiber 16 has a protective sleeve or casing $1f$ which has a noncircular cross section such as an elliptical cross section having a major axis extending substantially parallel to the support components $3f$ which support the core $2f$. It is noted that the deformation caused by the die 4 while applying a transverse stretching force to the support components $3e$ to stretch them into the configuration of the thin support components $3f$ and the deformation maintains the space factor or area of the fiber 16. Thus, the fiber along the major axis of the elliptical cross section of the sleeve $1f$ will have a length or dimension $j = 150$ $\mu$m and transverse to this direction will have a dimension or length $i = 50$ $\mu$m. Due to the transverse stretching, the support components $3f$ will have a thickness $d_2$ of approximately 0.65 $\mu$m. When using a noncircular fiber in accordance with this embodiment, the deformation created by passing the blank 15 through the die 4 produces a high degree of transverse stretching and at the same time a constant deformation over the whole length of the fiber. In a modification of the fabrication process the drawing of the fiber 15 in the intermediate state according to FIG. 6 from the noncircular blank is immediately followed by the deformation process to form the final fiber 16 with a cross-section as illustrated in FIG. 8, so that the longitudinal stretching of the blank to form the fiber and the non-rotational transversel deformation to form sufficiently thin support components are accomplished during a continuous heating-procedure.

Although various minor modifications may be suggested by those versed in the art, it should be understood that we wish to employ within the scope of the patent warranted hereon, all such modifications as reasonably and properly come within the scope of our contribution to the art.

We claim:

1. A method of producing a one-material optical fiber comprising a light conducting core supported in a protective sleeve by at least one support component, said method comprising the steps of providing a blank having a core and at least one supporting component disposed within a sleeve, heating the blank to a drawing temperature, drawing the blank into a fiber having a drawn core supported in a protective sleeve by a support component integral with both the sleeve and drawn core, and applying a stretching force to the support component in a direction transverse to the axis of the drawn core of the fiber to reduce the thickness of the support component and to reduce the ratio of the thickness of the support component to the thickness of the core of the fiber.

2. A method according to claim 1, wherein the step of applying a stretching force occurs subsequent to the drawing step.

3. A method according to claim 2, wherein the step of applying a stretching force comprises applying an excessive pressure to the interior of the protective sleeve to expand the diameter of the sleeve to cause stretching of the support component.

4. A method according to claim 1, wherein the step of applying a stretching force occurs during a last portion of the drawing step.

5. A method according to claim 2, wherein the step of providing a blank provides a core supported by a support component in a non-circular sleeve, wherein the step of drawing the blank produces a fiber having a protective sleeve having a major axis and minor axis with the support component extending transverse to the major axis and wherein the step of applying a stretching force comprises non-symmetrically deforming the fiber to apply the stretching force on the support component in a direction extending transverse to the axis of the core.

6. A method according to claim 4, wherein the step of applying a stretching force comprises non-symmetrically deforming of the drawn fiber into a non-circular fiber having a major axis and a minor axis with the support component extending in the direction of the major axis.

* * * * *